Nov. 24, 1964   W. H. HUBERT   3,157,913
ATTACHMENT FOR TRAIL SCOOTER
Filed May 3, 1963
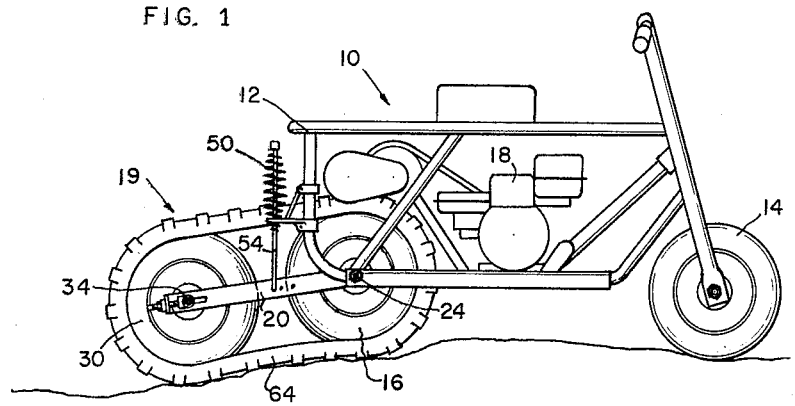
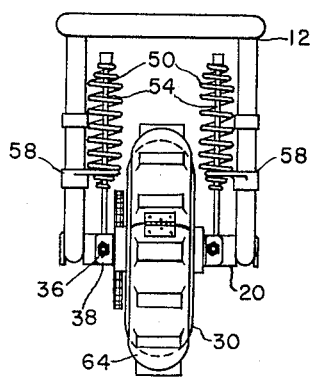
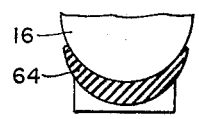
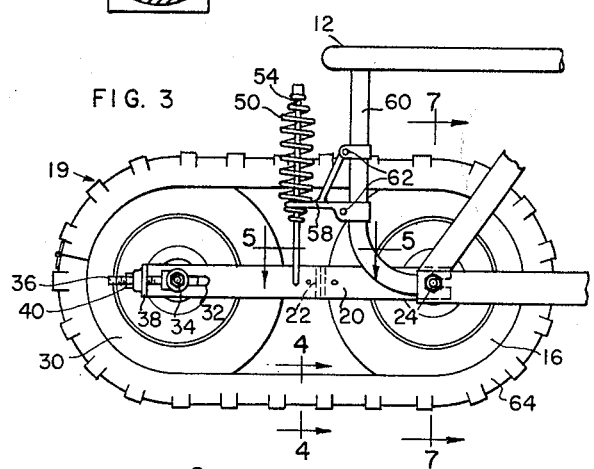
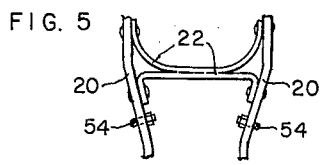
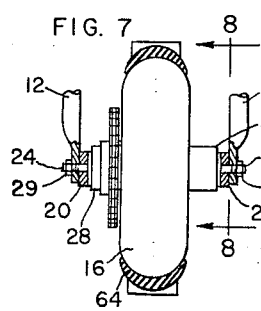
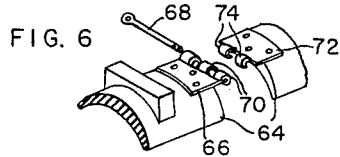
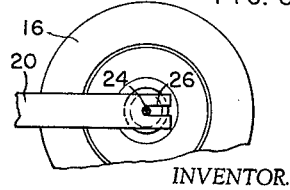
INVENTOR.
WILLIAM H. HUBERT
BY
BUCKHORN, BLORE, KLARQUIST & SPARKMAN
ATTORNEYS United States Patent Office 3,157,913
Patented Nov. 24, 1964

3,157,913
ATTACHMENT FOR TRAIL SCOOTER
William H. Hubert, 2721 N. Lombard, Portland, Oreg.
Filed May 3, 1963, Ser. No. 277,790
1 Claim. (Cl. 180—9.24)

The present invention relates to an attachment for a two-wheel land vehicle and more particularly to a crawler attachment for use with a power type trail scooter.

Motorized two-wheeled scooters, so-called trail scooters, are being increasingly used for travel in mountainous and like terrain. However, the conventional two-wheel type vehicle is not satisfactory for use in snow or mud or in steep and rough terrain.

It is an object of the present invention to provide an attachment for such trailer scooters which will enable them to be used in otherwise impassable terrain.

More specifically, it is the object of the invention to provide a crawler attachment for use with the trail scooter.

Another object of the invention is to provide a crawler device for a trail scooter which is simple but rugged in construction.

A further object of the invention is to provide a crawler attachment for a trail scooter having means to maintain the tread member of the attachment in engagement with the ground.

Other objects of the invention will become more apparent hereinafter.

In accordance with an illustrated embodiment the present invention comprises a crawler unit including a pair of side members for attachment to the frame of a two-wheeled trail scooter to extend rearwardly therefrom, the side members having mounted between them an idler wheel which rolls in tandem with respect to the rear wheel of such scooter. Trained over the scooter rear wheel and such idler wheel is an endless crawler member which is driven by the rear wheel of the scooter to give added traction and support to the vehicle in use. Spring means are provided to urge the crawler unit downwardly and into engagement with the ground.

For a more complete description of the invention, reference is made to the accompanying drawings and the following specification. In the drawings:

FIG. 1 is the side elevational view of a motor scooter and crawler attachment of the present invention;

FIG. 2 is a rear elevation thereof;

FIG. 3 is an enlarged side elevation of the rear portion of the scooter and the attachment of the invention showing certain details thereof;

FIG. 4 is a sectional view taken along line 4—4 of FIG. 3;

FIG. 5 is a top plan view of a fragmentary portion of the frame of the attachment taken generally along line 5—5 of FIG. 3;

FIG. 6 is a fragmentary perspective view showing details of the arrangement for connecting the ends of the crawler attachment together;

FIG. 7 is a fragmentary sectional view taken along line 7—7 of FIG. 3; and

FIG. 8 is a fragmentary sectional view taken along line 8—8 of FIG. 7.

With reference now to the drawings, illustrated therein is a typical two-wheeled trail scooter 10 having a tubular metal frame 12, a front wheel 14, and a rear wheel 16 driven by suitable drive means from a motor 18. Mounted on the scooter is the attachment 19 of the invention. Such attachment comprises a subframe, including a pair of elongate side members 20 which are rigidly joined together in spaced relation by a cross-bracket 22. The side members 20 are hingedly connected to the scooter in the illustrated embodiment, the side members 20 being hingedly mounted upon the axle 24 of the rear wheel 16.

Referring to FIGS. 7 and 8, the ends of the side members 20 are formed with slots 26 so as to permit the side members to slide endwise onto the axle 24 between the frame of the scooter and collars 28 which are fixed to the axle to hold the wheel in centered relation in the frame. Nuts 29 hold the axle in fixed position relative to the frame.

An idler wheel 30 is mounted between the side members 20 at the rear ends thereof in tandem with the scooter rear wheel 16. The side members 20 are provided with elongate slots 32 for receiving the axle 34 of the idler wheel. Means are provided for adjusting the position of the idler wheel 30 with respect to its spacing from the scooter rear wheel 16, such means comprising eye bolts 36 in which the axle 34 is received, the eye bolts 36 extending rearwardly through brackets 38 suitably mounted on the ends of the side members 20. Nuts 40 are provided to position the eye bolts with respect to the brackets 38.

Means are preferably provided to urge the idler wheel 30 downwardly so that it will remain in engagement with the ground during use of the scooter. In the illustrated embodiment such means comprise a pair of coil type tension springs 50 attached to the top ends of elongate rods 54 which are suitably secured one to each of the side members 20 and extend vertically therefrom. The lower ends of the springs 50 are engaged in brackets 58 detachedly secured to rear frame member 60 of the scooter by bolts 62.

A crawler element or tread member 64 extends about the scooter rear wheel 16 and idler wheel 30, the tread member being U shaped in cross section so that it straddles the wheels as shown in FIG. 4. For ease in mounting and dismounting of the tread member upon the wheels 16, 30 it is preferably in the form of an elongate, flexible element with means provided releasably to connect the ends of the elements together. Referring to FIG. 6, to one end of the tread element is fixedly secured, as by rivets, a plate 66 having a pin 68 extending through fingers 70. A plate 72 is secured upon the opposite end of the tread element, which plate is provided with a pair of hook like elements 74 adapted to be inserted between the fingers 70 and to engage the pin 68. Upon adjustment of the tensioning device 36–40, sufficient tension can be supplied to the tread member to retain the hooks 74 in position on the pin 78. The tension of the tread member 64 also holds the side members 20 in engagement upon the axle 24.

As will be evident, the device of the invention can be mounted and dismounted from the scooter relatively easily. To mount the attachment upon the scooter, the side members 20 are engaged upon the axle 24 of the scooter rear wheels, the spring brackets 53 are then attached to the frame and the tread member 64 extended about the wheels 16, 30. The tensioning device 36–40 is then adjusted to the proper tension and the device is in operating condition. To dismount the attachment, the reverse procedure is simply followed.

Having illustrated and described a preferred embodiment of the invention, it should be apparent that the invention permits of modification in arrangement and detail. I claim all such modifications as come within the spirit and scope of the appended claim:

In combination a land vehicle having a frame and a driven rear wheel mounted thereon, and an attachment therefor, said attachment comprising, a subframe including a pair of elongate side members mounted on said vehicle adjacent said rear wheel one on each side thereof, a cross bracket rigidly securing said members together,
said side members each having a longitudinal slot in one end thereof receiving the axle of said vehicle rear wheel,
an idler wheel rotatably mounted between said side members in tandem with said rear wheel,
an endless crawler element extending about said rear wheel and said idler wheel,
means mounting said idler wheel on said side members for movement toward and from said rear wheel so as to provide tension on said crawler element and urge said members into engagement with said axle,
a pair of spring brackets mounted on said vehicle frame above said subframe,
a pair of helical tension springs mounted one on each of said brackets,
a pair of push rods fixed at one end one to each to the top of said springs and at the other end to said subframe so as to urge the same downwardly.

References Cited by the Examiner
UNITED STATES PATENTS 3,101,805    8/63    Tritle _____ 180—33 X

FOREIGN PATENTS 39,543    8/24    Norway.

ARTHUR L. LA POINT, *Primary Examiner.*

PHILIP ARNOLD, *Examiner.*